(12) United States Patent
Shaked

(10) Patent No.: US 11,125,686 B2
(45) Date of Patent: Sep. 21, 2021

(54) SYSTEM AND METHOD FOR THREE-DIMENSIONAL LABEL-FREE OPTICAL IMAGING OF A BIOLOGICAL CELL SAMPLE IN AN ENVIRONMENTAL CHAMBER

(71) Applicant: RAMOT AT TEL-AVIV UNIVERSITY LTD., Tel Aviv (IL)

(72) Inventor: Natan Tzvi Shaked, Mazkeret Batya (IL)

(73) Assignee: RAMOT AT TEL-AVIV UNIVERSITY LTD.

( * ) Notice: Subject to any disclaimer, the term of this patent is extended or adjusted under 35 U.S.C. 154(b) by 0 days.

(21) Appl. No.: 16/621,811

(22) PCT Filed: Jun. 28, 2018

(86) PCT No.: PCT/IL2018/050707
§ 371 (c)(1),
(2) Date: Dec. 12, 2019

(87) PCT Pub. No.: WO2019/008569
PCT Pub. Date: Jan. 10, 2019

(65) Prior Publication Data
US 2020/0182788 A1    Jun. 11, 2020

Related U.S. Application Data

(60) Provisional application No. 62/529,080, filed on Jul. 6, 2017.

(51) Int. Cl.
*G01N 21/45*     (2006.01)
*G01N 15/14*     (2006.01)
*G03H 1/00*      (2006.01)

(52) U.S. Cl.
CPC ....... *G01N 21/453* (2013.01); *G01N 15/1475* (2013.01); *G03H 1/0005* (2013.01);
(Continued)

(58) Field of Classification Search
CPC ............. G01N 15/1475; G01N 21/453; G01N 2015/1445; G03H 1/0005; G03H 2001/005
See application file for complete search history.

(56) References Cited

U.S. PATENT DOCUMENTS 5,171,995 A    12/1992   Gast et al.
5,841,125 A    11/1998   Livingston
(Continued)

FOREIGN PATENT DOCUMENTS

EP       1148390 A2    10/2001
WO    2014124057 A1     8/2014

OTHER PUBLICATIONS

International Search Report for PCT Application No. PCT/IL2013/050241 dated Jul. 2009.
(Continued)

*Primary Examiner* — Michael A Lyons
(74) *Attorney, Agent, or Firm* — Dorsey & Whitney LLP

(57) ABSTRACT

The present invention relates to a novel label-free tomographic interferometry technique implemented inside an environmental chamber (e.g. imaging incubator) that provides rapid capturing of the three-dimensional (3-D) refractive index distribution of biological cells.

20 Claims, 9 Drawing Sheets

(52) U.S. Cl.
CPC ............... *G01N 2015/1445* (2013.01); *G03H 2001/005* (2013.01)

(56) References Cited

U.S. PATENT DOCUMENTS

| | | | |
|---|---|---|---|
| 5,943,134 | A | 8/1999 | Yamaguchi et al. |
| 6,266,147 | B1 | 7/2001 | Naulleau |
| 6,351,307 | B1 | 2/2002 | Erskine |
| 9,574,868 | B2 | 2/2017 | Shaked et al. |
| 2004/0121496 | A1 | 6/2004 | Brankner et al. |
| 2004/0212807 | A1 | 10/2004 | Hanson et al. |
| 2011/0242543 | A1 | 10/2011 | Wax et al. |
| 2012/0200901 | A1 | 8/2012 | Dubois et al. |
| 2012/0307035 | A1 | 12/2012 | Yaqoob et al. |
| 2013/0003073 | A1 | 1/2013 | Yu et al. |
| 2014/0113323 | A1* | 4/2014 | Egelberg ............ G01N 15/1468 435/29 |
| 2016/0290782 | A1 | 10/2016 | Girshovitz et al. |
| 2019/0163132 | A1* | 5/2019 | Sung .................... G02B 21/367 |

OTHER PUBLICATIONS

International Search Report for PCT Application No. PCT/IL2014/050834 dated May 2, 2015.
International Search Report for PCT Application No. PCT/IL2018/050707 dated Jan. 2015.
Bhaduri, et al., "Diffraction Phase Microscopy with White Light", Optics Letters / vol. 37, No. 6, 2012, pp. 1094-1096.
Bon, et al., "Quadriwave Lateral Shearing Interferometry for Quantitative Phase Microscopy of Living Cells", Optics Express vol. 17, No. 15, 2009, pp. 13080-13094.
Charriere, et al., "Cell Refractive Index Tomography by Digital Holographic Microscopy", Optics Letters vol. 31, No. 2, 2006, pp. 178-180.
Charriere, et al., "Living Specimen Tomography by Digital Holographic Microscopy: Morphometry of Testate Amoeba", Optics Express vol. 14, No. 16, 2006, pp. 7005-70013.
Choi, et al., "Field-Based Angle-Resolved Light-Scattering Study of Single Live Cells", Opt Lett. Author Manuscript, 2008, pp. 1-7.
Choi, et al., "Tomographic Phase Microscopy", 2007, pp. 717-719.
Ding, et al., "Instantaneous Spatial Light Interference Microscopy", Optics Express vol. 18, No. 2, 2010, pp. 1569-1575.
Edwards, et al., "Optically Monitoring and Controlling Nanoscale Topography During Semiconductor Etching", 2012, 7.
Ferraro, et al., "Quantitative Phase Microscopy of Microstructures with Extended Measurement Range and correction of Chromatic Aberrations by Multiwavelength Digital Holography", Optics Express vol. 15, No. 22, 2007, pp. 14591-15600.
Frenklach, et al., "Off-Axis Interferometric Phase Microscopy with Tripled Imaging Area", Optics Letters, 2014, pp. 1525-1528.
Gabolde, et al., "Single-Shot Measurement of the Full Spatio-Temporal Field of Ultrashort Pulses with Multi-Spectral Digital Holography", Optics Express vol. 14, No. 23, 2006, pp. 11460-11467.
Gao, et al., "Parallel Two-Step Phase-Shifting Point-Diffraction Interferometry for Microscopy Based on a Pair of Cube Beamsplitters", Optics Express vol. 19, No. 3, 2011, pp. 1930-1935.
Girshovitz, et al., "Compact and Portable Low-Coherence Interferometer with Off-Axis Geometry for Quantitative Phase Microscopy and Nanoscopy", Optics Express vol. 21, No. 5, 2013, pp. 5701-5714.
Girshovitz, et al., "Doubling the Field of View in Off-Axis Low-Coherence Interferometric Imaging", 2013, 5.
Girshovitz, et al., "Generalized Cell Morphological Parameters Based on Interferometric Phase Microscopy and their Application to Cell Life Cycle Characterization", Biomedical Optics Express vol. 3, No. 8, 2012, pp. 1757-1773.
Guo, et al., "Reflective Point-Diffraction Microscopic Interferometer with Long-Term Stability", Chinese Optic Letters, 2011, pp. 1-3.
Isikman, et al., "Lens-Free Optical Tomographic Microscope With a Large Imaging Volume on a Chip", www.pnas.org/cgi/doi/10.1073/pnas.1015638108, 2010, pp. 1-6.
Jang, et al., "Self-Reference Quantitative Phase Microscopy for Microfluidic Devices", Optics Letters vol. 34, No. 4, 2010, pp. 514-516.
Kak, et al., "Principles of Computerized Tomographic Imaging", IEEE Press, 1988, 3.
Kemper, et al., "Simplified Approach for Quantitative Digital Holographic Phase Contrast Imaging of Living Cells", Journal of Biomedical Optics, vol. 6, No. 2, 2011, pp. 1-4.
Kim, et al., "High-Resolution Three-Dimensional Imaging of Red Blood Cells Parasitized by Plasmodium Falciparum and In Situ Hemozoin Crystals Using Optical Diffraction Tomography", Journal of Biomedical Optics, vol. 19, 2014, pp. 1-12.
Kim, et al., "Simultaneous 3D Visualization and Position Tracking of Optically Trapped Particles Using Optical Diffraction Tomography", Optica vol. 2, No. 4, 2015, pp. 343-346.
Kolman, et al., "Coherence-Controlled Holographic Microscope", Optics Express vol. 18, No. 21, 2010, pp. 21990-22003.
Lee, et al., "Field-Portable Reflection and Transmission Microscopy Based on Lensless Holography", Biomedical Optics Express vol. 2, No. 9, 2011, pp. 2721-2730.
Liu, et al., "Super-Resolution Digital Holographic Imaging Method", Applied Physics Letters vol. 18, No. 17, 2002, pp. 3143-3145.
Lue, et al., "Synthetic Aperture Tomographic Phase Microscopy for 3D Imaging of Live Cells in Translational Motion", Optics Express vol. 16, No. 20, 2008, pp. 16240-16246.
Mico, et al., "Common-Path Phase-Shifting Digital Holographic Microscopy: A way to Quantitative Phase Imaging and Superresolution", V. Mico et al. / Optics Communications 281, 2008, pp. 4273-4281.
Mico, et al., "Common-Path Phase-Shifting Lensless Holographic Microscopy", Optics Letters vol. 35, No. 23, 2010, pp. 3919-3921.
Mico, et al., "Superresolution Digital Holographic Microscopy for Three-Dimensional Samples", Optics Express vol. 16, No. 23, 2008, pp. 19260-19270.
Monemhaghdoust, et al., "Dual Wavelength Full Field Imaging in Low Coherence Digital Holographic Microscopy", Optics Express vol. 19, No. 24, 2011, pp. 24005-24022.
Mor, et al., "Rapid 3D Refractive-Index Imaging of Live Cells in Suspension Without Labeling Using Dielectrophoretic Cell Rotation", © 2016 The Authors. Published by Wiley-VCH Verlag GmbH & Co. KGaA, Weinheim; Adv. Sci. 2017, 4, 1600205, 2016, pp. 1-9.
Mor, et al., "Tomographic Phase Microscopy with 180° Rotation of Live Cells in Suspension by Holographic Optical Tweezers", Optics Letters / vol. 40, No. 8, 2015, pp. 1881-1884.
Paturzo, et al., "Super-Resolution in Digital Holography by a Two-Dimensional Dynamic Phase Grating", Optics Express vol. 16, No. 21, 2008, pp. 17107-17118.
Popescu, et al., "Diffraction Phase Microscopy for Quantifying Cell Structure and Dynamics", Optics Letters vol. 31, No. 6, 2006, pp. 775-777.
Shaked, et al., "Parallel On-Axis Holographic Phase Microscopy of Biological Cells and Unicellular Microorganism Dynamics", Applied Optics vol. 49, No. 15, 2010, pp. 2872-2878.
Shaked, et al., "Quantitative Microscopy and Nanoscopy of Sickle Red Blood Cells Performed by Wide Field Digital Interferometry", Journal of Biomedical Optics vol. 16 No. 3, 2011, pp. 1-3.
Shaked, et al., "Quantitative Phase Microscopy of Biological Samples Using a Portable Interferometer", Optics Letters vol. 37, No. 11, 2012, pp. 2016-2018.
Shaked, et al., "Reflective Interferometric Chamber for Quantitative Phase Imaging of Biological Sample Dynamics", Journal of Biomedical Optics vol. 15, No. 3, 2010, pp. 1-3.
Shock, et al., "Optical Phase Nanoscopy in Red Blood Cells Using Low-Coherence Spectroscopy", Journal of Biomedical Optics vol. 17, No. 10, 2012, pp. 1-5.
Sung, et al., "Optical Diffraction Tomography for High Resolution Live Cell Imaging", Optics Express / vol. 17, No. 1, 2009, pp. 266-277.

(56) References Cited

OTHER PUBLICATIONS

Uttam, et al., "Optically Multiplexed Imaging with Superposition Space Tracking", Optics Express vol. 17, No. 3, 2009, pp. 1691-1713.
Wang, et al., "Pulsed Digital Holography System Recording Ultrafast Process of the Femtosecond Order", Optic Letters vol. 31, No. 11, 2006, pp. 1636-1638.
Wang, et al., "Spatial Light Interference Microscopy (SLIM)", Optics Express vol. 19, No. 2, 2011, pp. 1016-1026.
Xue, et al., "Single-Shot Slightly-Off-Axis Interferometry Based Hilbert Phase Microscopy of Red Blood Cells", Optics Express vol. 2, No. 4, 2011, pp. 987-995.
Yoon, et al., "Label-Free Characterization of White Blood Cells by Measuring 3D Refractive Index Maps", Biomedical Optics Express vol. 6, No. 10, 2015, pp. 3865-3875.
Hsu, W.C., et al. "Tomographic diffractive microscopy of living cells based on a common-path configuration" Opt. Lett. 39, 2210-2213 (2014).

\* cited by examiner

SYSTEM AND METHOD FOR THREE-DIMENSIONAL LABEL-FREE OPTICAL IMAGING OF A BIOLOGICAL CELL SAMPLE IN AN ENVIRONMENTAL CHAMBER

TECHNOLOGICAL FIELD

The present invention relates to a system and method for three-dimensional label-free optical imaging of a biological cells sample accommodated in an environmental chamber.

BACKGROUND ART

References considered to be relevant as background to the presently disclosed subject matter are listed below:
1. Choi, W. et al. Tomographic phase microscopy. *Nat. Methods* 4, 717-719 (2007).
2. Isikman, S. O. et al. Lens-free optical tomographic microscope with a large imaging volume on a chip. *Proc. Natl. Acad. Sci. U.S.A.* 108, 7296-7301 (2011).
3. Kim, K. et al. High-resolution three-dimensional imaging of red blood cells parasitized by Plasmodium falciparum and in-situ hemozoin crystals using optical diffraction tomography. *J. Biomed. Opt.* 19, 011005 (2014).
4. Sung, Y. et al. Optical diffraction tomography for high resolution live cell imaging. *Opt. Express* 17, 266-277 (2009).
5. Hsu, W. C., Su, J. W., Tseng, T. Y. & Sung, K. B. Tomographic diffractive microscopy of living cells based on a common-path configuration. *Opt. Lett.* 39, 2210-2213 (2014).
6. Yoon, J. et al. Label-free characterization of white blood cells by measuring 3D refractive index maps. *Biomed. Opt. Express* 6, 3865-3875 (2015).
7. Lue, N. et al. Synthetic aperture tomographic phase microscopy for 3D imaging of live cells in translational motion. *Opt. Express* 16, 16240-16246 (2008).
8. Charrière, F. et al. Cell refractive index tomography by digital holographic microscopy. *Opt. Lett.* 31, 178-180 (2006).
9. Charrière, F. et al. Living specimen tomography by digital holographic microscopy: morphometry of testate amoeba. *Opt. Express* 14, 7005-7013 (2006).
10. Habaza, M., Gilboa, B., Roichman, Y. & Shaked, N. T. Tomographic phase microscopy with rotation of live cells in suspension by holographic optical tweezers. *Opt. Lett.* 40, 1881-1884 (2015).
11. Kim, K., Yoon, J. & Park, Y. K. Simultaneous 3D visualization and position tracking of optically trapped particles using optical diffraction tomography. *Optica* 2, 343-346 (2015).
12. Shaked, N. T. Quantitative phase microscopy of biological samples using a portable interferometer. *Opt. Lett.* 37, 2016-2019 (2012).
13. Girshovitz, P. & Shaked, N. T. Compact and portable low-coherence interferometer with off-axis geometry for quantitative phase microscopy and nanoscopy. *Opt. Express* 21, 5701-5714 (2013).
14. Kak, A. C. & Slaney, M., Principles of Computerized Tomographic Imaging (IEEE Press, 1988).

Acknowledgement of the above references herein is not to be inferred as meaning that these are in any way relevant to the patentability of the presently disclosed subject matter.

BACKGROUND

Biological cells are three-dimensional (3-D) entities and imaging them in three dimensions while they are in vitro, without using staining to enhance contrast, is a great challenge since they are mostly transparent under regular light microscopy. As an example, imaging a woman egg (occyte) in a dish is required following in vitro-fertilization (IVF). The ability to image fertilized eggs up to six days after in vitro-fertilization (IVF), and before implantation in the womb, plays an important role in the success of the IVF process, measured in success of the pregnancy and the birth of a healthy baby. Fertilized eggs, such as other live biological cells, are 3-D dynamic objects that constantly adjust their sizes, shapes and other biophysical features.

In general, visualizing cellular phenomena requires microscopic techniques that can achieve high data acquisition rates, while retaining both resolution and contrast to observe fine cellular features. However, cells in vitro (in a dish or in a tube) are mostly-transparent 3-D objects with absorbance and reflection characteristics that are very similar to their surroundings, and thus conventional intensity-based light microscopy approaches lack the required sensitivity. Conventional phase contrast imaging methods, such as Zernike's phase contrast and differential interference contrast (DIC), are not quantitative, and present significant imaging artifacts. Indirect cell analyses rely on labeling of a specific cellular entity using exogenous labeling agents, such as fluorescent dyes that tend to photo-bleach, and might damage the sample viability.

GENERAL DESCRIPTION

A key effort in the field of assisted reproduction technology (ART), and in vitro diagnosis (IVD) of cells in general, is aimed at achieving affordable label-free imaging, but there is still a need in the art to provide a fully quantitative imaging of the cells. Specifically for eggs, this imaging is used as a means of evaluating its quality, while being inside an environmental chamber (e.g. an imaging incubator), providing the required constant temperature and gas supply (since moving the egg in and out the incubator for imaging damages its viability). Currently available imaging techniques for imaging fertilized eggs in environmental chambers use label-free bright-field microscopy or label-free differential interference contrast (DIC) microscopy. Label-free bright-field microscopy lacks the required imaging contrast to characterize the fertilized egg quality. DIC microscopy is not a quantitative imaging technique; it allows seeing only inner component's edges, but does not allow getting meaningful contrast from all points on the egg. In addition, it allows only about 10 axial sections, in a typical 0.13 mm egg.

Currently, there is no label-free imaging technology that presents the possibility to acquire a 3-D image of a fertilized egg while being in an incubator, without labeling at x-y-z resolutions of less than 1 micron.

Biological cells in vitro are mostly transparent under regular light microscopy, and therefore cannot be imaged well without external stains or contrast agents, which might be harmful to the cells and are not allowed in certain medical procedures. Since off-axis holography records the quantitative phase profile, which takes into account the cell refractive index and physical thickness, the present invention provides quantitative topographic maps of the cell from a single camera exposure, with great contrast and without the need for external contrast agents. Furthermore, even if using contrast agents in flow cytometry, the fact that phase profile is quantitative and accounts for the cell internal refractive indices, gives rise to new parameters with medical relevance that were not previously available in flow cytometry, such as the dry mass of the cells.

Wide-field interferometric phase microscopy is useful for quantitatively imaging biological cells, without the need for labeling. This is done by capturing the complex wave front of the sample, containing a two-dimensional (2D) optical path delay (OPD) map of the sample, taking into consideration both the cell thickness and its refractive index content. To obtain the OPD map, this technique creates on the camera interference between the light passing through the sample and a reference beam that does not contain spatial sample information. A small off-axis angle is induced between the beams to allow OPD map reconstruction from a single camera exposure.

To obtain three spatial dimensions in label-free interferometric phase imaging, tomographic interferometry captures the complex wave fronts of the light transmitted through the cell from various angles, enabling the calculation of a 3-D refractive-index map of the sample. To view the sample from multiple angles, one can rotate the illumination beam, while leaving the measured specimen stationary [1-6]. This approach is not invasive to the sample during data acquisition. However, the acceptance angle of the illumination is limited, typically to 140°, causing missing data points in the angular spectrum. Alternatively, the cells can be imaged during laminar flow, but with limited angular range, and without verified control on the viewing angle [7]. Other approaches allow full angular range, by either rotating the entire sample [8] or patch clamping single cells [9]. These approaches, however, do not allow for non-invasive 3-D imaging of cells in suspension. To cope with this barrier, integrating holographic optical tweezers with tomographic interferometry has been proposed recently [10, 11]. One method is able to rotate small and relatively dense cells across 180° range [10].

The present invention provides a novel label-free tomographic interferometry technique implemented inside an environmental chamber (e.g. imaging incubator) that provides rapid capturing of the three-dimensional (3-D) refractive index distribution of biological cells. According to one broad aspect of the present invention, there is provided a system for non-invasive imaging of a sample of biological cells in vitro, without labeling. The sample may contain at least biological cells, such as a fertilized egg or cancer cells. In this connection, it should be noted that the present invention is not limited to any type of biological cells. The system comprises inter alia an environmental chamber for accommodating the sample. The environmental chamber comprises an interferometric tomography module configured and operable for generating an illumination beam towards the sample and generating multiple interferometric projections of the biological cell at various angles. The system also comprises a control unit configured and operable to perform rotation of the illumination beam and/or rotation of the sample, receive interferometric projection images, process the images to create phase projections into a 3-D Fourier space, and generate a three-dimensional refractive index distribution of the sample. The novel technique performs such imaging by rotating the cell itself, or by rotating the illumination beam surrounding the cell. To obtain tomography, the cell(s) is assumed not to be dynamic during the time of measurement (several seconds). Then, the illumination angles can be changed to obtain multiple points of view. Alternatively, the illumination angle stays constant and the cell itself is rotated in 3-D using a micromanipulation method. The environmental chamber may comprise a trapping element configured and operable to trap and rotate the sample in a rotation angular range of about 0° to about 360°. Therefore, the trapping element may comprise at least one of optical tweezers, dielectrophresis (DEP), or fluidic rotation elements to enable rotation of the cell within the chamber during generation of the multiple interferometric projections of the sample at various angles while the interferometric projections are taken.

The interferometric projections of the cell are then taken by an imaging interferometric tomography module, and are processed by a control unit into the 3-D refractive index map of the entire cell. The interferometric tomography module may comprise an off-axis interferometer and a bright-field microscope. This is performed by mapping the phase projections into the 3-D Fourier space using either a filter-back projection or diffraction-theory reconstruction algorithms. Next, quantitative parameters and the protein contents of the cell can be calculated by the control unit based on its 3-D refractive index distribution. In some embodiments, the control unit is configured and operable to calculate quantitative parameters comprising 3-D protein content of the sample comprising at least one of cellular volume, surface area, 3-D shape and dry mass density. The control unit is coupled to the interferometric tomography module for receiving interferometric images and processing the images. The interferometric tomography module and the control circuit can be connected by IR (Infra-Red), RF (radio frequency including Bluetooth) or cable control. It should be noted that all required processing operations (such as receiving an image data, rotating the illumination beam, rotating the sample, creating phase projections in the 3D Fourier space, generating a 3-D refractive index distribution, providing a quantitative phase map), may be performed by means of a control unit, such as a DSP, microcontroller, FPGA, ASIC, etc., or any other conventional and/or dedicated computing unit/system. The term "control unit" should be expansively construed to cover any kind of electronic device with data processing capabilities, including, by way of non-limiting example, personal computers, servers, computing systems, processors (e.g. digital signal processor (DSP), microcontrollers, field programmable gate array (FPGA), an application specific integrated circuit (ASIC), etc.), smartphone, tablet and other electronic computing devices. The control unit may comprise a general-purpose computer processor, which is programmed in software to carry out the functions described herein below.

In some embodiments, this technique provides full (360°) coverage of the rotation angular range on any axis, and knowledge on the viewing angle by assuming a constant rotation angle and the period of the full rotation.

In some embodiments, the cells are trapped and rapidly rotated by dielectrophoretic forces in a noninvasive and precise manner. Interferometric projections of the rotated cell are acquired and processed by the control unit into the cellular 3-D refractive index map.

In some embodiments, the technique of the present invention enables imaging a biological cell within an environmental chamber due to the compactness of the system. The environmental chamber (e.g. imaging incubator) is configured to facilitate monitoring and/or controlling environmental factors including temperature, pressure, humidity, electrical fields, oxygen level, and so on. The new technique provides optically imaging in 3-D without labeling cells, and calculating their 3-D protein contents. Using tomographic phase microscopy (computed tomography (CT) of optical phase images), images of the cell inside its environmental chamber are acquired from multiple points of view using interferometry, and the interferometric projections are used to reconstruct the 3-D refractive index distribution of the sample at about 0.5 micron resolution on all axes without labeling. Therefore, in some embodiments, the control unit is configured and operable to reconstruct the 3-D refractive index distribution of the sample. Furthermore, using the reconstructed 3-D distribution, various parameters of clinical value are calculated, assisting the clinician choosing the best cell. The valuable parameters include inter alia the embryo 3-D non-specific protein contents (dry mass), its cellular organelles volume, surface area, and 3-D shapes. Specifically, as the invention is able to facilitate selection of a fertilized egg in IVF, an increase in pregnancy rates may result.

In some embodiments, the environmental chamber comprises a microfluidic channel configured and operable for at least one of flowing, trapping, rotating at least one biological cell based on DEP forces, and manipulating the sample.

In some embodiments, the system comprises an environmental conditions control module being coupled to the environmental chamber and being configured and operable to measure and maintain the environmental conditions within the chamber.

In some embodiments, the interferometric tomography module is configured and operable to illuminate the sample at various angles at once to thereby perform optical multiplexing, such that a plurality of rotated holograms are projected at once. The interferometric tomography module may comprise a grating element configured and operable for splitting the illumination beam into a plurality of spaced-apart beams to thereby separate complex wave fronts in the spatial frequency domain. The system may comprise a detector configured for simultaneously acquiring at once a plurality of off-axis interference patterns not overlapping in the spatial-frequency domain.

In some embodiments, the environmental chamber comprises a sampling holder configured for holding the sample. The sampling holder has a non-flat bottom surface. The bottom surface of the sampling holder defines an apex being formed by at least two inclined intersecting cross sections. The environmental chamber may comprise an illumination source and a scanning rotating reflecting surface downstream to the illumination source. The scanning rotating reflecting surface may be configured for receiving the illumination beam from the illumination source and for sequentially directing the illumination beams at different angles towards the sample.

According to another broad aspect of the present invention, there is also provided a method for non-invasive imaging of a sample containing at least one cell without labeling. The method comprises the steps of accommodating a sample within an environmental chamber; imaging the sample within the environmental chamber; rotating an illumination beam while leaving the sample stationary and/or the sample; generating a plurality of 3-D interferometric projections at various angles; and processing the images to create phase projections into a 3-D Fourier space and generating a 3-D refractive index distribution of the sample.

In some embodiments, the method further comprises illuminating the sample at various angles at once.

In some embodiments, the method further comprises splitting the illumination beam into a plurality of spaced-apart beams to thereby separating complex wavefronts in the spatial frequency domain and projecting onto a camera a plurality of rotated holograms at once.

In some embodiments, the method further comprises simultaneously acquiring at once a plurality of off-axis interference patterns not overlapping in the spatial-frequency domain.

In some embodiments, the step of rotating an illumination beam, while leaving the sample stationary and/or the step of rotating the sample comprises controlling fringe orientation of the off-axis interference patterns.

According to another broad aspect of the present invention, there is also provided an environmental chamber for holding a sample to be rotated. The novel environmental chamber is not limited to the use of the system as described above. The novel environmental chamber comprises a housing accommodating a sampling holder configured for holding the sample. The sampling holder has a non-flat bottom surface. The bottom surface of the sampling holder may define an apex being formed by at least two inclined intersecting cross sections.

In some embodiments, the environmental chamber further comprises an interferometric tomography module accommodated within the housing and is configured and operable for generating multiple interferometric projections of the sample at various angles, wherein the interferometric tomography module comprises an off-axis interferometer and a bright-field microscope.

In some embodiments, the environmental chamber further comprises an illumination source generating an illumination beam towards the sample and a scanning rotating reflecting surface downstream to the illumination source; wherein the scanning rotating reflecting surface is configured for receiving the illumination beam from the illumination source and for sequentially directing the illumination beams at different angles towards the sample. The illumination source and the scanning rotating reflecting surface may be accommodated within the housing.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
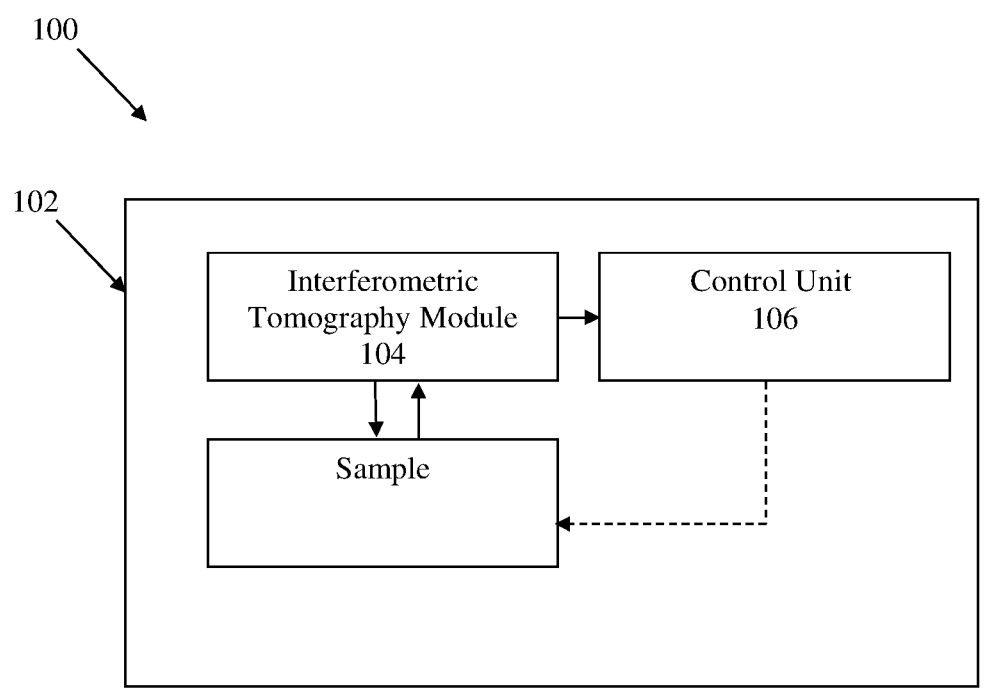
FIG. 1a shows a schematic block diagram of the principal functional elements of the system of the present invention.

Reference is made to FIG. 1a illustrating a system 100 for non-invasive imaging of a sample comprising at least one biological cell without labeling according to some embodiments of the present invention. The system 100 comprises inter alia an environmental chamber 102 for accommodating the sample. The environmental chamber 102 comprises an interferometric tomography module 104 configured and operable for generating an illumination beam towards the sample and generating multiple interferometric projections of the cell at various angles. The interferometric tomography module 104 is placed within the environmental chamber 102 such that the sample should not be taken out of the environmental chamber to be inspected. The system 100 also comprises a control unit 106 configured and operable to perform the steps of (1) at least one of rotation of the illumination beam (i.e. sequentially actuating at least one optical element for scanning the sample by illumination at different incident angles), and rotation of the sample, (2) receiving interferometric projection images, (3) processing the images to create phase projections into a 3-D Fourier space and (4) generating a 3-D refractive index distribution of the sample.

Figure 1B:
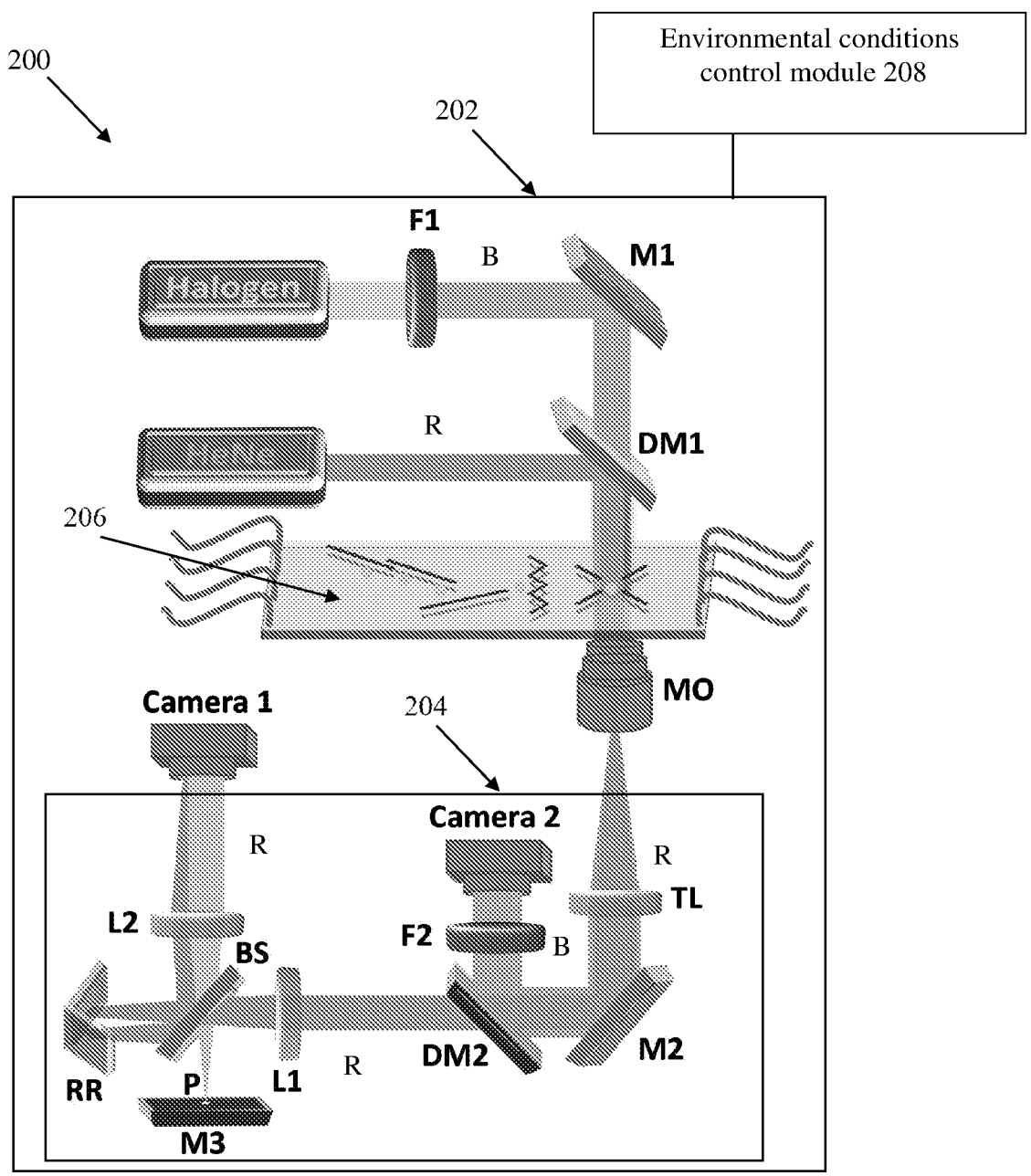
FIG. 1b shows a possible schematic optical set-up scheme of the system of the present invention according to some embodiments.

FIG. 1b illustrates an optical setup scheme for interferometric tomography with full rotation of trapped cells. The system 200 comprises an environmental chamber 202 which may optionally include a microfluidic dielectrophresis (DEP)-based channel 206 for cell rotation and an interferometric tomography module for acquisition of off-axis interferograms during cell rotation. In this connection, it should be understood that although in the specific and non-limiting example illustrated in FIG. 1b, the cells flow in a microfluidic flow environment, the present invention is not limited to cells flowing in a microfluidic flow environment, but includes also static cells being imaged by cell rotation or mirror/illumination rotation. In some embodiments, the system 200 comprises an environmental conditions control module 208 being coupled to the environmental chamber 202 and being configured and operable to measure and maintain the environmental conditions within the chamber 202. The environmental conditions comprise inter alia at least one of $CO_2$ and oxygen content of the atmosphere inside the environmental chamber 202. The environmental conditions control module 208 comprises a plurality of sensors for measuring the environmental conditions and a processing module for controlling and maintaining the optimal conditions within the environmental chamber 202. The processing module may be accommodated within the environmental conditions control module 208 or may be accommodated within the control unit of the system (not shown in this figure) which may or may not be accommodated within the system of the present invention. For the sake of illustration, the environmental conditions control module 208 is represented outside the environmental chamber 202, but this configuration is only for the sake of illustration and the environmental conditions control module 208 may be accommodated within the environmental chamber 202.

From these interferometric projections, the cell complex wave front can be reconstructed. This system 200 includes two imaging channels: interferometric microscopy for acquisition of off-axis image interferograms during cell rotation, and bright-field microscopy for imaging the cells and controlling cell trapping and rotation. Therefore, the interferometric tomography module comprises an interferometric microscope 204 and a bright-field microscope illustrated by its microscope objective MO used as a control imaging system. The red beams referred to as R represent interferometric microscopy, while the blue beams referred to as B represent bright-field microscopy. In a specific and non-limiting example illustrated in the figure, in the interferometric microscopy channel, light from a helium-neon laser noted as HeNe is reflected to the sample by dichroic mirror DM1 and then magnified by a 60× immersion-oil microscope objective. The enlarged image is projected by tube lens TL onto the exit of the microscope, where an off-axis interferometric module 204 is positioned. The off-axis module 204 may be of the type described in references [12,13]. In this module 204, the magnified sample beam is split using beam splitter BS. One of the beams is spatially filtered using lenses L1 and L2 and pinhole P that selects only the low spatial frequencies and, thus, effectively creates a reference beam that does not contain spatial modulation from the sample. The other beam from the beam splitter BS is projected through a retro reflector RR at a small angle, and, together with the reference beam, creates an off-axis interferogram (or off-axis hologram) on Camera 1. From this off-axis interferogram, the complex wave front of the cell at the present viewpoint can be reconstructed, as will be described further below. In the bright-field imaging channel, a tungsten-halogen lamp noted as Halogen is spectrally filtered using bandpass filter F1, projected onto the sample, magnified by either a 10× or a 60× immersion-oil microscope objective, and projected through tube lens TL, dichroic mirror DM2, and spectral bandpass filter F2 onto Camera 2. In this specific and non-limiting example, the interferometric microscope also comprises three mirrors, noted M1-M3 aimed at directing the different beams. In some embodiments, mirror M1 is a scanning mirror aimed at sequentially rotating the illumination beam for imaging the trapped cell in transmission mode to enable interferometric projections in a range of about −70° to +70°.

Interferometric projections from various points of view of a cell trapped by a trapping element, as obtained by DEP rotation, were acquired for tomography. As described above, a Helium-Neon laser (632.8 nm, 5 mW, Thorlabs) was used as a light source of an inverted microscope (Olympus IX81), for generating an illumination beam and imaging the trapped cell in transmission mode. As shown in FIG. 1b, the beam was reflected by dichroic mirror DM1 (short-pass, cut off at 550 nm, Edmunds Optics) onto the sample plane and propagated through a microscope objective MO (Olympus PlanApo, 60×, 1.4 NA, immersion oil). In this interferometric tomography module, the image plane is optically Fourier transformed by lens L1 (f=7.5 cm), and split into two separate beams by beam splitter BS. One of the beams (referred to as the reference beam) propagates towards pinhole P (diameter of 15 μm), which spatially filters the beam and erases the sample high spatial frequencies, turning it into a reference beam. Mirror M3 reflects the filtered beam, and then lens L2 (f=7.5 cm) Fourier transforms it back onto the camera plane. The other beam at the exit of beam splitter BS (referred to as the sample beam) is reflected back using retro-reflector RR, which shifts the center of the spatial-frequency domain. Because of this shift, the sample and reference beams interfere at a small angle on Camera 1 in FIG. 1b (CMOS camera, DCC1545, Thorlabs, with 1024×1280 square pixels, 5.2 µm each). The off-axis angle between the beams was set so that a fringe interference cycle contains three pixels. This off-axis interferogram allows reconstruction of the complex wave front of the sample from a single exposure. This digital reconstruction includes a Fourier transform on the acquired off-axis interferograms using Matlab™. Then, one of the cross-correlation terms shifted from the center of the spatial-frequency domain is digitally cropped and an inverse Fourier transform is applied to the result. Applying a 2-D phase unwrapping algorithm to the argument of the resulting complex wave front solves $2\pi$ ambiguities, and yields the unwrapped phase map of the sample from a single point of view of the cell.

Bright field microscopy was used as a control system, in order to view the trapped cells, evaluate coarse time of the rotation cycle, and validate that the rotation is performed over the axis of choice. In this imaging channel, light from a tungsten-halogen lamp was filtered through a band pass filter F1(475/35 nm), transmitted through the sample and through one of these two microscope objectives: Olympus PlanApo, 10×, 0.25 NA objective for imaging the microchannel in a wide field of view, or Olympus PlanApo, 60×, 1.4 NA, oil-immersion objective for imaging only the cell in the DEP field cage. Dichroic mirror DM2 (long-pass, 505 nm, Edmunds Optics) reflected the bright-field image through bandpass filter F2 (475/28 nm) onto Camera 2 (Olympus F-View II, 1376×1032 pixels, 6.45 µm each) in FIG. 1b.

In some embodiments, the present invention provides a novel technique for interferometric tomography with 360° rotation of at least one live cell on any axis with angular resolution of less than 2.5°, non-invasively (i.e. without physically touching the cells).

In some embodiments, as described below, the system provides an interferometric imaging of cells, while being trapped, manipulated and fully rotated by a trapping element using DEP forces. DEP can be utilized for cell micromanipulation, as well as detection of inherent cellular traits such as membrane capacitance, electrical conductivity, nucleic acid content, as well as cell size and deformability, which can be utilized for cell sorting. Microfluidics combined with DEP enable the manipulation of small volumes of liquids while trapping and controlling cells non-invasively. The present invention provides fully capturing of the 3-D refractive index map of single cells, temporally trapped in a cell flowing environment, in a non-invasive manner with control on the viewing angle. The inventors of the present invention have performed experiments providing 3-D, label-free imaging of both large cancer cells and three-types of white blood cells. However, this technique is not limited to these live cells and is also applicable to imaging of fertilized eggs. The present invention allows full experimentally measured tomography, with complete rotation on any axis, of cells with knowledge of the angle of the projection at a given time. It should be noted that during recording of data, cells experience no physical contact, and only very moderate light exposure. Both features minimize any adverse effects that could affect the status of the cells or their viability.

In some embodiments, the live cells were unattached live cells, while temporally trapped and rotated. The suspended cell rotation was steady enough, with less than 0.5% error, to allow tomography with full rotation of both large cells, such as cancer cells, and small cells, such as white blood cells, as experimentally demonstrated. These results illustrate that the technique of the present invention is an integrated label-free, rapid approach for 3-D cell label-free imaging and analysis. Due to its non-invasiveness and straightforward recovery of cells after inspection, this technique enables label-free cell sorting, monitoring cellular pathological conditions in body fluids and especially in blood, as well as for therapeutic purposes.

Figure 1C:
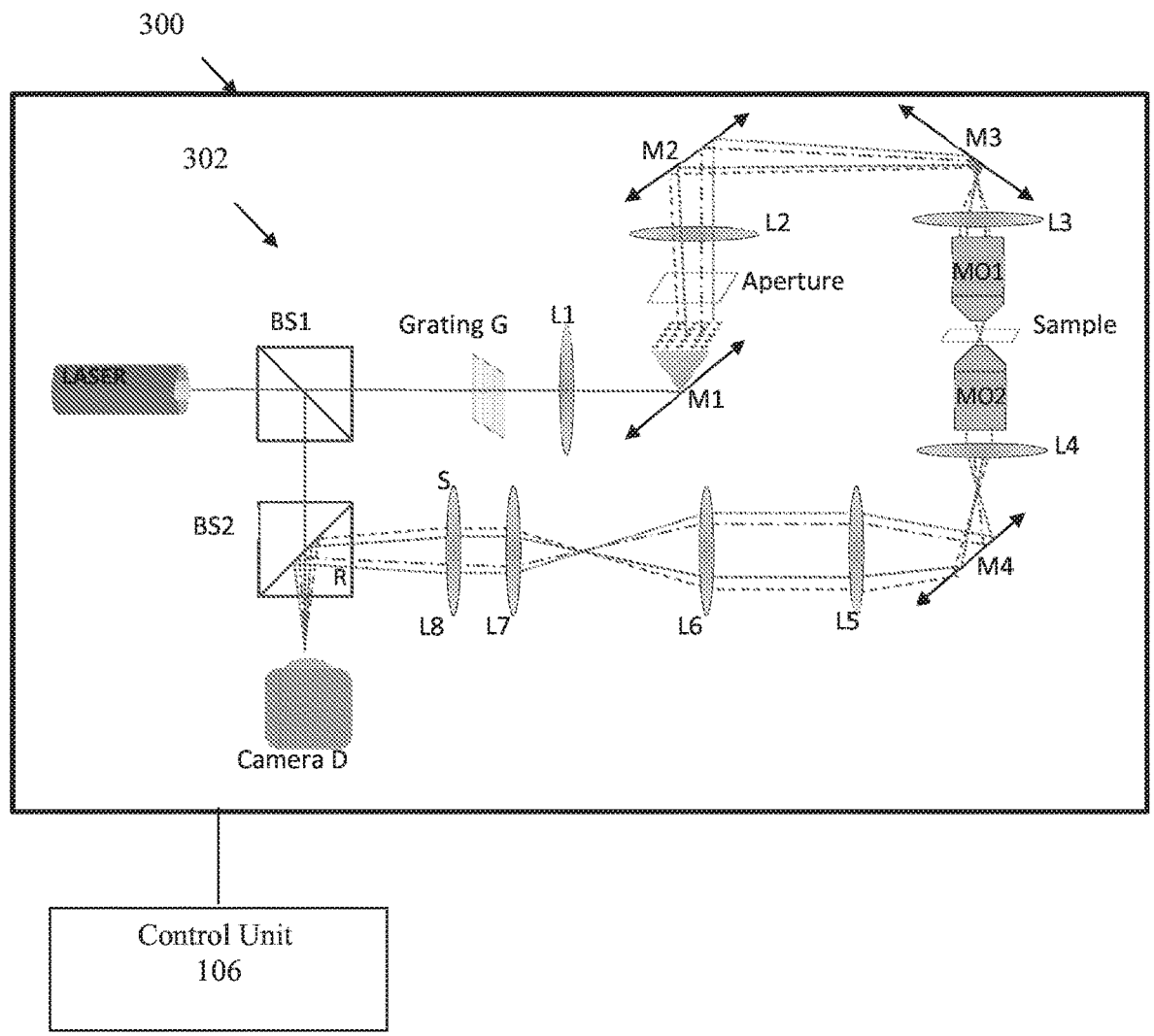
FIG. 1c shows another possible schematic optical set-up scheme of the system of the present invention according to some embodiments.

FIG. 1c illustrates another aspect of the present invention, in which a different optical multiplexing setup based on a grating element splits one of the beams into several copies (up to six without resolution or magnification loss), such that the transverse location of the beams at the exit of the grating controls the fringe orientation on the camera. In this way, several rotated off-axis holograms are projected onto the camera at once. More specifically, due to its compactness, the interferometric tomography module 302 of the present invention is accommodated in the housing of an environmental chamber 300 and is connected to a control unit 106 configured and operable to perform rotation of the illumination beam, and/or rotation of the sample, receive interferometric projection images, process the images to create phase projections into a 3-D Fourier space and generate a three-dimensional refractive index distribution of the sample. In this specific and non-limiting example, the interferometric tomography module 302 comprises a first beam splitter/combiner BS1 for receiving a laser illumination beam and splitting the illumination beam into first sample and second reference beam, referred to as S and R beams. The first beam passes through a special grating element G configured and operable to separate the sample beam into a plurality of spaced-apart beams. The grating element G is used in order to illuminate the sample from various angles at once. For example, this specific and non-limiting set-up enables to illuminate the sample four angles at once. However, the present invention is not limited to any specific number of angles. Illuminating the sample at up to six angles at once is possible without resolution or magnification loss. The grating element G is configured and operable to separate the multiple complex wave fronts, each with another angular projection of the sample, in the spatial frequency domain into spaced-apart beams. The spaced-apart beams pass through a first lens element L1 focusing each of the spaced-apart sample beams onto a first reflecting surface M1 at different geometrical positions. Each sample beam passes through an aperture configured and operable to select the right illumination angles and through a second lens element L2 focusing each sample beam onto different geometrical positions of a second reflecting surface M2 positioned at a parallel plane with respect to the first reflecting surface M1. The aperture selects the beams such that they induce off-axis fringes with the right orientation on the digital camera or optical detector D. Since each beam creates different orientation of fringes with a predefined orientation, and the coinciding complex wave fronts are separated in the spatial frequency domain, all angular projections are to be reconstructed from the coinciding off-axis holograms, simultaneously projected onto the digital camera or optical detector D. Each sample beam is then directed towards a third reflecting surface M defining a certain angle with respect to second reflecting surface M2. Each sample beam is then directed towards a third lens L3 focusing each sample beam onto a first microscope objective MO1 illuminating the sample. Optionally, each magnified light beam presenting amplitude and phase modulation of an input light incident on the sample is then directed towards a second microscope objective MO2 configured and operable to magnify the sample image and through a fourth lens element L4 focusing the spaced-apart sample beams onto a fourth reflecting surface M4 positioned at a parallel plane with respect to the first and second reflecting surfaces M1 and M2. The spaced-apart sample beams then pass through four lensing elements L5, L6, L7 and L8 forming a 4-f lens configuration and are then directed towards a second beam splitter BS2 configured and operable to combine each spaced-apart sample beam with the reference beam coming from the first beam splitter BS1. The optical detector D is configured for simultaneously acquiring at once a plurality of off-axis interference patterns between the plurality sample beams and the reference beam. The plurality of simultaneously obtained interference patterns do not overlap in the spatial-frequency (Fourier) domain, so that all of them can be acquired at once. In this way, multiplexing several perspective views of the sample into a single hologram is obtained. The optical detector D acquires multiple holograms of the sample from multiple perspectives, which allows performing computed tomography and reconstruction of the full three-dimensional refractive index profile of the sample. Since the interferometric module 300 provides multiplexing of multiple perspectives and acquires them at once, angular scanning for the tomography is faster, which allows acquiring three-dimensional refractive index profiles of samples with faster dynamics. For example, in the case the optical set-up enables to illuminate the sample at four angles at once, the scanning of the sample may be performed for each sample beam by rotating the scanning illumination beam only from 0° to 90° giving a total angular scanning of 360° for a time period divided by four. Therefore, the interferometric module of the present invention also provides less angular scanning for tomography as compared to conventional systems. The present invention thus provides tomography with fast scanning of the illumination. A plurality of regular off-axis holograms at various angles is thus generated on the same interferometric projection, forming a multiplexed off-axis hologram that can be acquired in a single exposure.

Figure 1D:
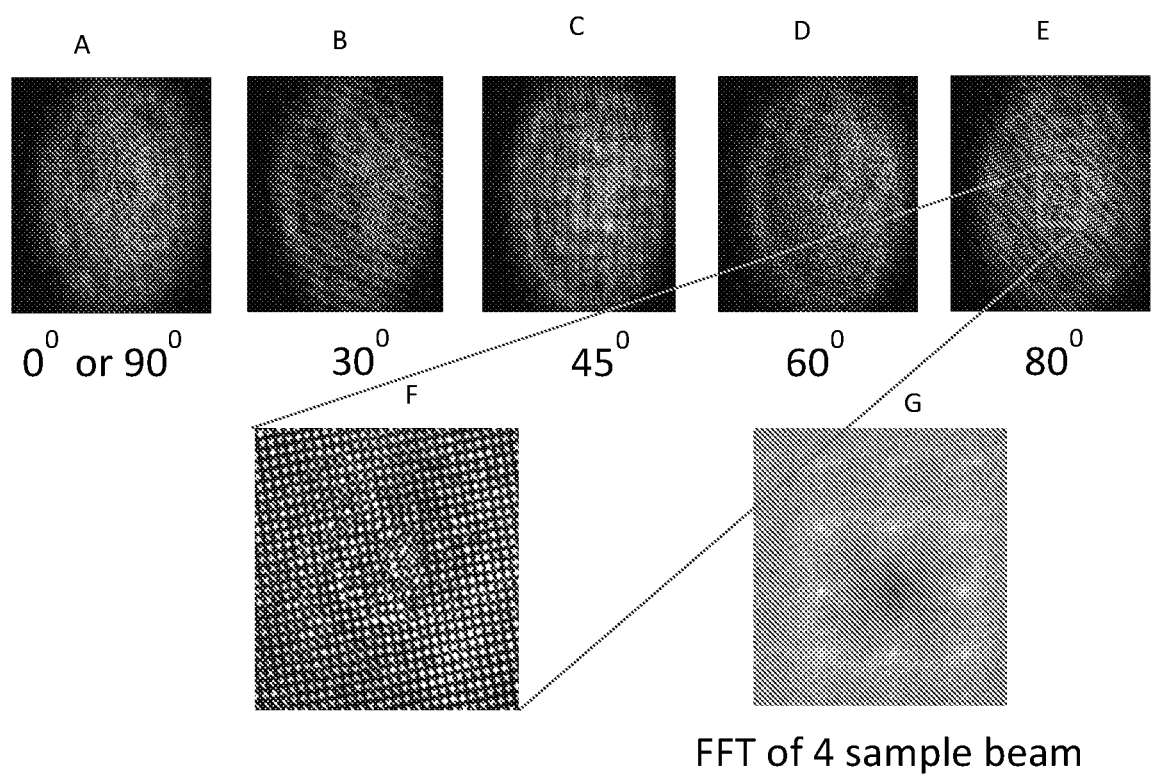
FIG. 1d shows five pictures of the same sample acquired by using the teachings of the present invention at different angles; one picture shows an enlargement of a region of a sample acquired at an angle of 80° and one picture is a Fast Fourier Transform (FFT) of four sample beams.

FIG. 1d illustrates five pictures of the same sample acquired by using the teachings of the present invention at different angles. Pictures A-B illustrate images of the same sample acquired at various angles. Picture A illustrates an image of the sample acquired at an angle of 0° or 90°. Picture B illustrates an image of the sample acquired at an angle of 30°. Picture C illustrates an image of the sample acquired at an angle of 45°. Picture D illustrates an image of the sample acquired at an angle of 60°. Picture E illustrates an image of the sample acquired at an angle of 80°. A portion of image E is enlarged in picture F. Picture G illustrates a Fast Fourier transform image acquired by the optical detector of the present invention as described above with respect to FIG. 1c illustrating an interference pattern for four different sample beams indicative of four different angles impinging on the sample. From these pictures, it can be seen that a multiplexed hologram containing four projections, each encoded with a different fringe orientation, is projected onto the camera at once.

Figure 1E:
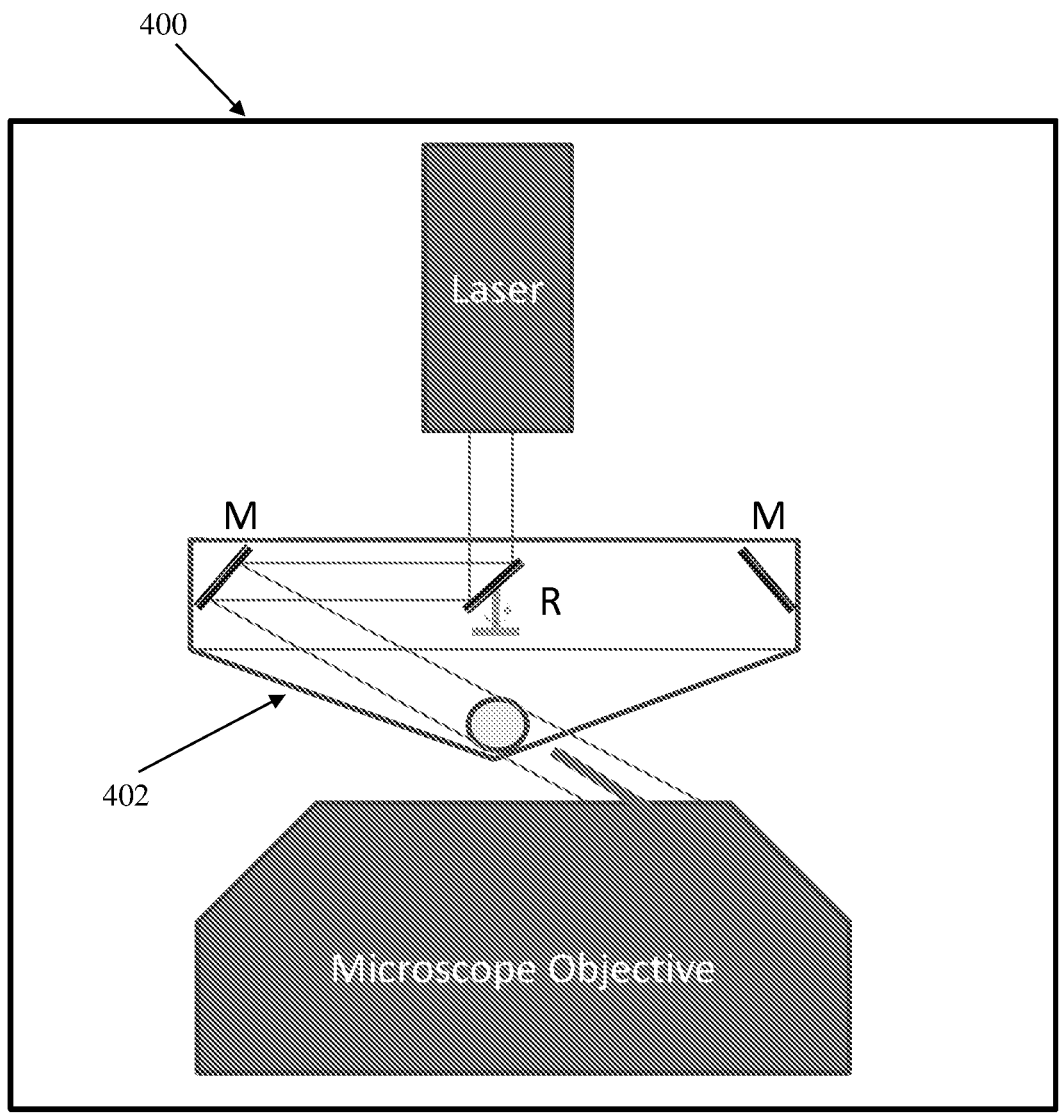
FIG. 1e shows a cross-sectional view of a possible configuration of the environmental chamber containing illumination scanning inside according to some embodiments of the present invention.

Computed Tomography (CT) images often suffer from artifacts caused by misaligned scanner geometry of the system. Calibration and correction must be done before image reconstruction. In cone-beam CT systems, it takes special care to ensure that the x-ray focal spot, the center of rotation of the system, and the center of the detector, fall in a straight line. To solve this problem, several methods for geometrical calibration of tomographic systems have already been proposed to calculate or estimate the geometry of x-ray CT. FIG. 1e shows a cross-sectional view of a possible configuration of the environmental chamber 400 according to some embodiments of the present invention. In some embodiments, the sampling holder 402 is configured for holding a cell having an external surface at least partially curved (e.g. the fertilized egg), and for being accommodated within the bottom center of environmental chamber 400 (i.e. housing) during tomography. Sampling holder 402 may have a bottom surface being not flat and having an apex being formed by at least two inclined intersecting cross sections such that, due to gravity forces, since the cell has a curved shape, it is always positioned accurately in the center of the sampling holder. The cell sits at the bottom of the sampling holder 400, where, due to gravitation, the curved cell is positioned at the center. The 3-D shape of the bottom of the sampling holder 402 might be conical or diamond-like shape (the latter avoids glass curvatures that might affect the beam shape). In this way, the center of rotation of the sample is not displaced, eliminating the use of calibration methods for finding the center of the cell. In this connection, it should be noted that this configuration of the sampling holder solves the problem of finding the center of rotation of any cell having an external surface at least partially curved, and can be used with any optical microscopy inspection system. The configuration of the sampling holder is not limited to the use of the environmental chamber of the present invention.

In some embodiments, environmental chamber 400 may be integrated in any interferometric microscope, turning any regular microscope into a tomographic one, with illumination scanning. In this way, environmental chamber 400 may be configured as a tomographic phase microscopy environmental chamber. In this specific and non-limiting example, environmental chamber 400 comprises an illumination source denoted as laser generating an illumination beam being sequentially rotated to scan the sample at various angles. The illumination source may be accommodated within the housing of the environmental chamber 400. More specifically, the environmental chamber 400 comprises a sampling holder 402 having a top scanning portion accommodating a scanning element and at least one angular direction element, and a bottom portion holding the sample under inspection. The sampling holder 402 comprises at least one opening for inserting the sample. The top and bottom portions may be configured as two separate chambers, or may be integrated in the same chamber. The top portion of the sampling holder 402 may comprise a scanning rotating reflecting surface (e.g. mirror or diffraction grating) referred to as R placed downstream to the illumination source and being configured for receiving the illumination beam from the illumination source and for sequentially directing the illumination beams at different angles towards the side of the sampling holder 402. In this connection, it should be understood that the environmental chamber 400 might be used for imaging a sample at one angle at a time. To this end, the scanning rotating reflecting surface is implemented by a mirror. Alternatively, the environmental chamber 400 might be used for imaging a sample with angular multiplexing, as described above. To this end, the scanning rotating reflecting surface can be implemented by a diffraction grating splitting the beam into multiple beams illuminating the sample from different angles at once. The scanning rotating reflecting surface is connected to a control unit (not shown) actuating the element. If the scanning rotating reflecting surface is a mirror, the rotation is mechanical. If the scanning rotating reflecting surface is a diffraction grating, the control unit generates an electrical control of the diffraction grating. Sampling holder 402 may comprise a mirror have a ring-shape configuration referred to as M being placed at the side of the top portion of the sampling holder 402 downstream to the scanning mirror R. Mirror M is configured for receiving the scanning illumination beam and for reflecting the scanning illumination beam towards the sample. For example, mirror M may be an inclined mirror polygon ring, in which the faces of the polygon are equal to the number of scanning angles. In the figure, the two parts of the polygon ring, around and above the sample, are represented at the opposite sides of the top portion of the sampling holder 402. The scanning range of the environment chamber is generally limited by the numerical aperture of the microscope objective (typically −70° to +70°). It should be understood that, in this specific and non-limiting example, in contrast to environmental chambers known in the art, all the scanning elements (R and M) are accommodated inside the environmental chamber (in the housing of the environmental chamber) providing a way of transforming an existing commercially available microscope into a tomographic one. Moreover, this configuration enables to provide a disposable environmental chamber. The reference beam and the complex wave front of the sample are superimposed on the camera referred as the microscope objective (digital holographic microscopy) for each angle. All recorded complex wave fronts from all angles are processed into the 3-D refractive index map of the cell, using tomographic phase microscopy algorithms.

Figure 2:
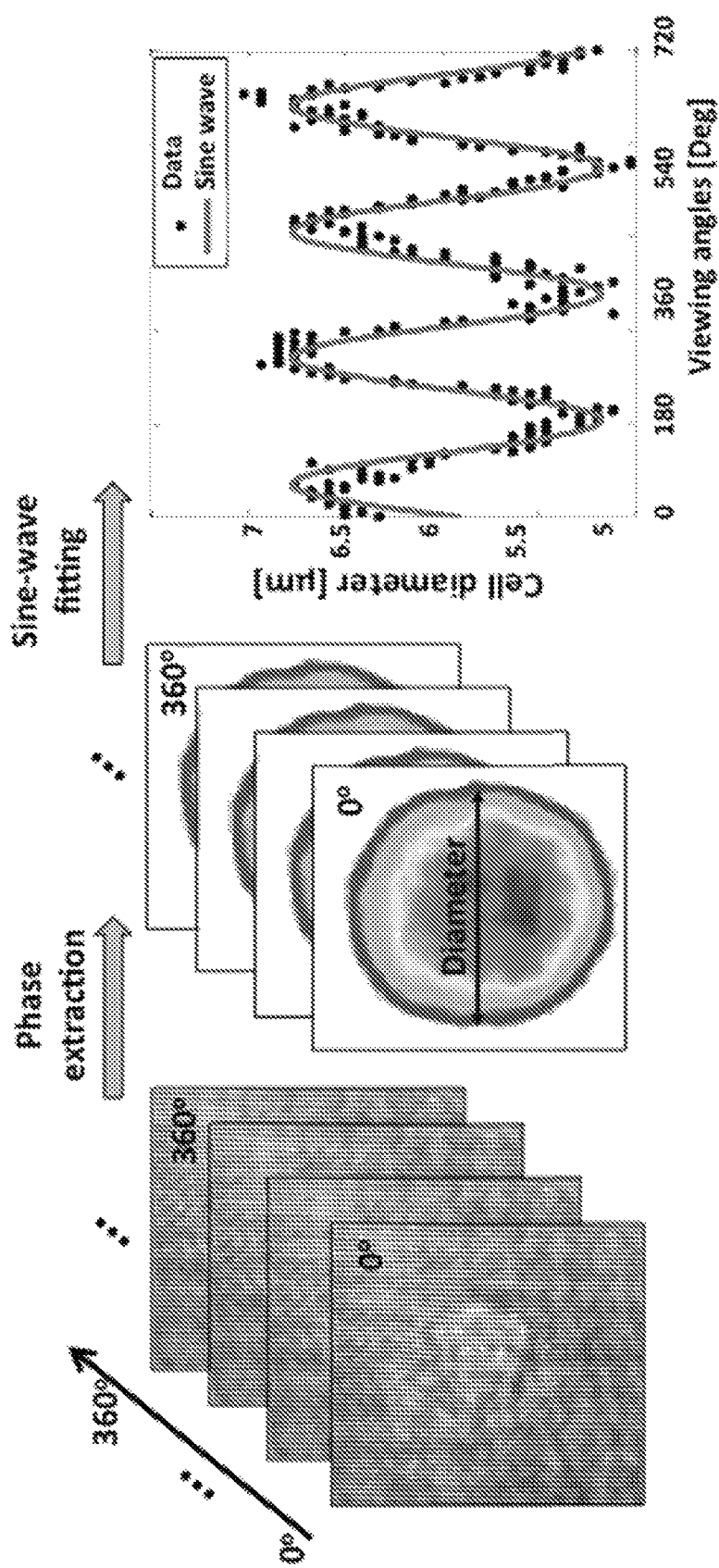
FIG. 2 shows the detection of the rotation cycle time and evaluation of the angle of the present point of view.

FIG. 2 illustrates detection of rotation cycle time and evaluation of the angle of the present point of view by fitting the cell diameter in the quantitative phase map during cell rotation to a sine wave. By fitting the cell diameter values from the cell projections to a sine wave, with coefficient of determination of $R^2=0.85$, the frequency of cell rotation was determined. For the experimental demonstrations, 150 interferometric projections were taken from a complete angular range of 360° and in equally discrete jumps. When mapping to a point in the 3-D Fourier space overlapped with an existing one, the point values were averaged. All phase projections were then processed digitally to create the 3-D refractive-index map of the cell by both the filtered back projection and the diffraction-theory reconstruction algorithms, as described for example in reference [14]. In this reconstruction process, each projection is mapped to a surface in 3-D Fourier space, where the full rotation provided by DEP enables a full angular coverage of the Fourier space, in contrast to previous methods possessing limited angular range [1-7]. The (y,z) and x spatial refractive-index resolutions were evaluated as 0.31 μm and 0.4 μm, respectively, by performing spatial derivations of the 3-D refractive-index map and determining the full-width at half-maximum.

Figure 3A:
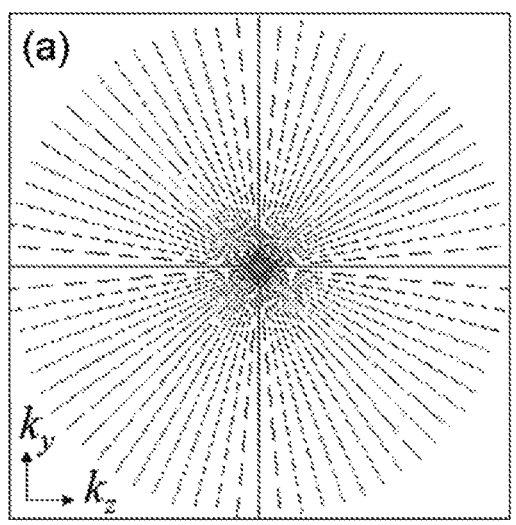
FIGS. 3a-3b show a mapping of a $k_y$-$k_z$ plane of the Fourier space derived from all projections, as based on a back-projection method illustrated in FIG. 3a, and a diffraction method illustrated in FIG. 3b.
Figure 3B:
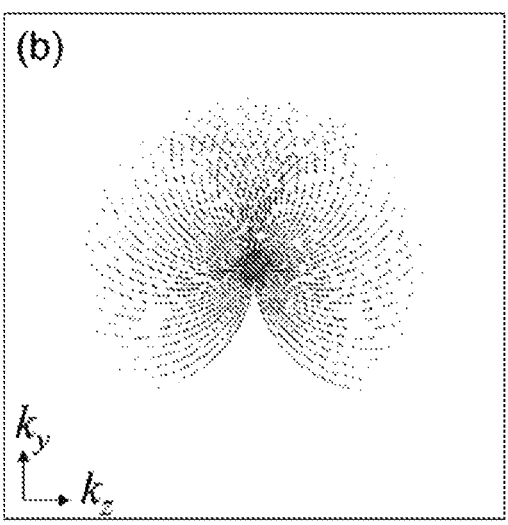

Then, the complex wave front projections were processed digitally to create the 3-D refractive index map of the cell by either the filtered back-projection algorithm or diffraction theory algorithm. Both reconstruction algorithms may be implemented using Matlab™. First, the phase of the projection for the back-projection tomography method and the optical diffraction tomography method are defined, and a Fourier transform is performed over it. FIGS. 3*a*-3*b* show the results of the mapping of all projections on $k_y$-$k_z$ plane of the Fourier space based on the back-projection method and the diffraction method, respectively. After mapping the projections to the Fourier space, a three-dimensional inverse Fourier transform is performed, and the refractive index is extracted according to the reconstruction method.

Figure 4A:
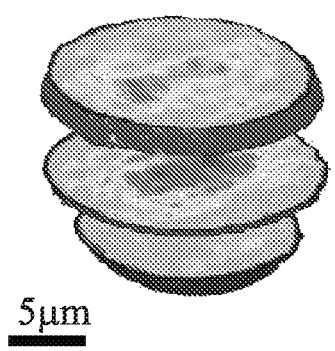
FIGS. 4a-4b show 3-D renderings of the reconstructed refractive index map of an MCF-7 cancer cell.
Figure 4B:
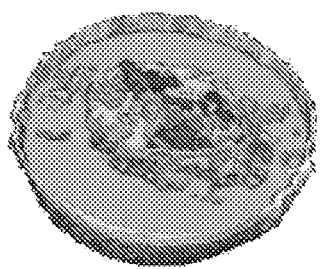
Figure 4B:
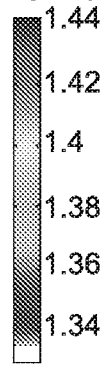
Figure 4C:
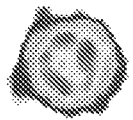
FIGS. 4c-4h show refractive index maps of three types of white blood cells at the central Z positions (FIGS. 4c-4e), and the coinciding 3-D renderings (FIGS. 4f-4h)
Figure 4D:
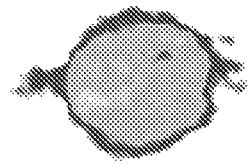
Figure 4E:
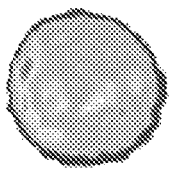
Figure 4E:
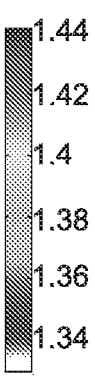
Figure 4F:
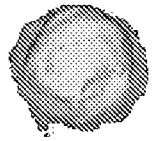
Figure 4G:
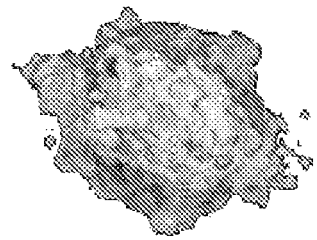
Figure 4H:
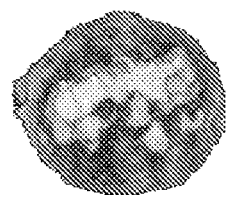

Reference is made to FIGS. 4*a*-4*b* illustrating 3-D renderings of the reconstructed refractive index map of a large MCF-7 cancer cell in suspension, as acquired by interferometry during DEP rotation in the microfluidic channel illustrated in FIG. 1*b*. FIGS. 4*c*-4*h* show refractive index maps of three types of white blood cells at the central Z positions (FIGS. 4*c*-4*e*), and the coinciding 3-D renderings (FIGS. 4*f*-4*h*). FIG. 4*c* and FIG. 4*f* show a resulting 3-D refractive index map of a T-cell. As can be seen in these figures, these cells are relatively small and have a large volume of the nuclear zone, in comparison to the monocyte shown in FIG. 4*d* and FIG. 4*g*. As can be seen in the latter figure, monocytes present a relatively large and a less spherical shape, with larger nuclear and cytoplasmic volume. In contrast, neutrophils, shown in FIG. 4*e* and FIG. 4*h* are spherical and present a large cytoplasmic volume, corresponding to previous label-based imaging studies. In these figures, it is possible to distinctively visualize the cell shape, cytoplasm, nuclear and nucleosomic zones, with refractive index values corresponding to previous works. Therefore, the technique of the present invention was also used to acquire three types of white blood cells, illustrating its label-free cell sorting following a blood test.

Figure 5:
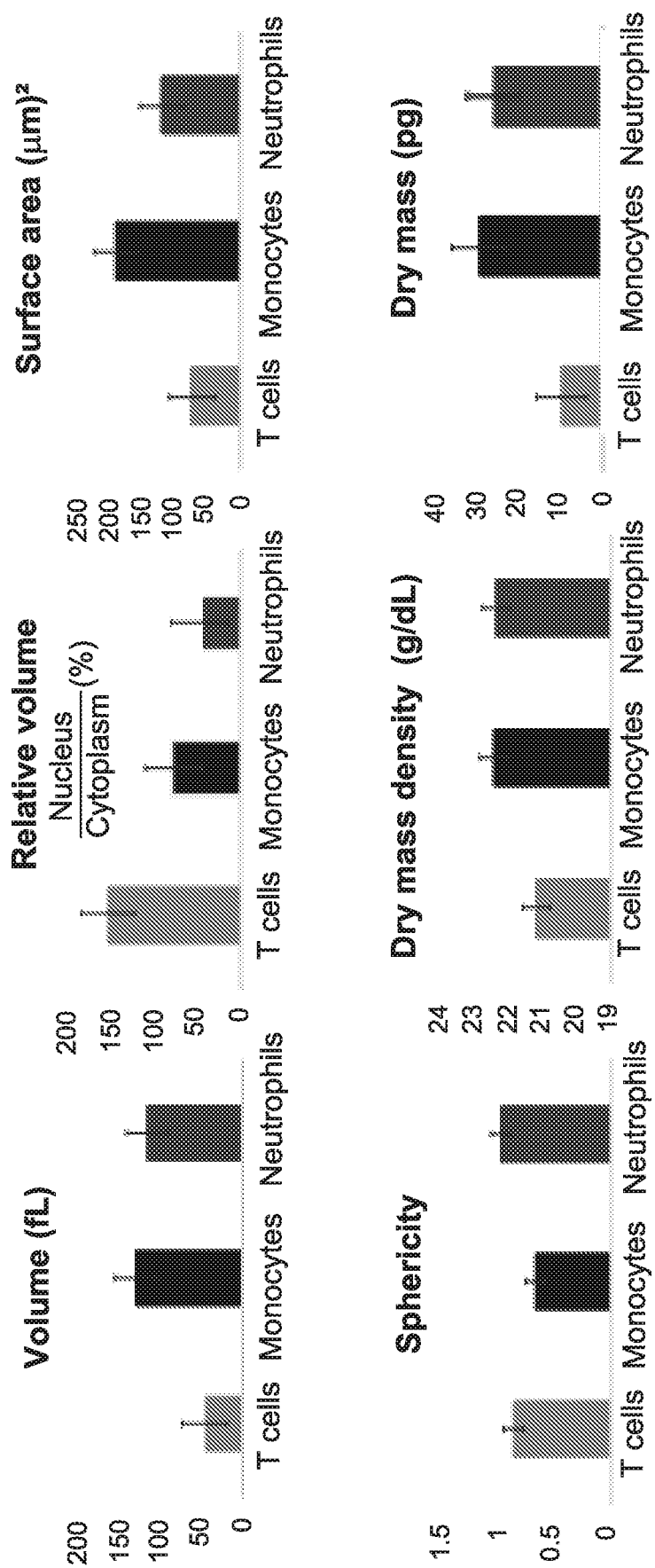
FIG. 5 shows parameter sets of three types of live white blood cells in suspension, based on calculation of the cells' 3-D refractive index maps obtained by using the technique of the present invention.

Following the reconstruction of the 3-D refractive-index map, various quantitative parameters were calculated for white blood cells. The cellular volume V was obtained by counting the number of voxels inside the 3-D refractive-index map of the cell multiplied by the voxel size. Cytoplasm and nucleus volumes were calculated in the same way as the total volume, but at the locations of low and high refractive indices, respectively (the values of which are elaborated for each cell type in the main text). The surface area S was calculated after locating the boundary of the cellular 3-D refractive-index map. The sphericity of the cell is defined as follows [6]: $\pi^{1/3}(6V)^{2/3}/S$. The dry mass density was calculated as follows: $\rho=(n-n_m)/a$ where n is the mean refractive-index value of the cytoplasm, $n_m$ is the refractive index of the surrounding medium and a is the specific refractive index increment and set to 0.2 mL/g. Integration of the total dry mass density over the cellular volume yields the cell dry mass. FIG. 5 presents various parameters for the three types of live white blood cells measured in suspension, based on the calculation of the cell 3-D refractive index maps obtained by the technique of the present invention. These include the cell total volume, nucleus to cytoplasm refractive index ratio, surface area, dry mass density, and total dry mass. The nucleus and cytoplasm volumes were discriminated in three-dimensions based on the cell refractive index values (T cells: nucleus, 1.4045±0.0087, cytoplasm, 1.3748±0.0088; monocyte: nucleus, 1.3949±0.0050, cytoplasm, 1.3777±0.0085; neutrophils: nucleus, 1.4061±0.0108, cytoplasm, 1.3759±0.0091). This 3-D imaging-based parameter set can aid sorting procedures of white blood cells without the need for labeling.

The invention claimed is:

1. A system for non-invasive imaging of a sample of biological cells in vitro, the system comprising:
an environmental chamber for accommodating said sample; said environmental chamber comprising an integrated beam scanning rotating reflecting surface being placed downstream to an illumination source and upstream the sample and at least one integrated mirror being placed downstream to the scanning rotating reflecting surface; wherein said integrated beam scanning rotating reflecting surface is configured for receiving the illumination beam for an illumination source and for generating a plurality of scanning illumination beams and directing each scanning illumination beam at different angles towards the mirror; said at least one integrated mirror being configured for receiving the scanning illumination beams and for directing the scanning illumination beams towards the sample; and a control unit configured and operable to perform at least one of rotation of the illumination beam or rotation of said sample, to receive interferometric projection images, to process said images to create phase projections into a 3-D Fourier space and to generate a 3-D refractive index distribution of said sample.

2. The system of claim 1, wherein said environmental chamber comprises a microfluidic channel configured and operable for at least one of flowing, trapping, rotating at least one sample based on dielectrophoresis forces and manipulating said sample.

3. The system of claim 1, wherein said environmental chamber comprises a trapping element configured and operable to trap and rotate the sample in a rotation angular range of about 0° to about 360° wherein said trapping element comprises at least one of optical tweezer or dielectrophoresis element to enable rotation of said biological cell within said environmental chamber during the generation of said multiple interferometric projections of said sample at various angles.

4. The system of claim 1, wherein said interferometric tomography module comprises an off-axis interferometer and a bright-field microscope.

5. The system of claim 1, wherein said control unit is configured and operable to at least one of (i) calculate quantitative parameters comprising 3-D protein content of said sample comprising at least one of cellular volume, surface area, 3-D shape and dry mass density or (ii) reconstruct the 3-D refractive index distribution of the sample at about 0.5 micron resolution on all axes.

6. The system of claim 1, further comprising an environmental conditions control module being coupled to said environmental chamber and comprising a plurality of sensors being configured and operable to measure the environmental conditions and a processing module for controlling and maintaining the environmental conditions within said chamber.

7. The system of claim 1, wherein said interferometric tomography module is configured and operable to illuminate the sample at various angles at once to thereby perform optical multiplexing, such that a plurality of rotated holograms are projected at once.

8. The system of claim 1, wherein said interferometric tomography module comprises a grating element configured and operable for splitting the illumination beam into a plurality of spaced-apart beams to thereby separate complex wave fronts in the spatial frequency domain.

9. The system of claim 1, further comprising a detector configured for simultaneously acquiring at once a plurality of off-axis interference patterns not overlapping in the spatial-frequency domain.

10. The system of claim 1, wherein said environmental chamber comprises a sampling holder configured for holding said sample; said sampling holder having a non-flat bottom surface.

11. The system of claim 10, wherein said non-flat bottom surface of the sampling holder defines an apex being formed by at least two inclined intersecting cross sections.

12. The system of claim 1, wherein said environmental chamber comprises an illumination source and said scanning rotating reflecting surface is configured for sequentially directing the illumination beams at different angles towards the sample.

13. The system of claim 1, wherein said at least one integrated mirror has a ring-shape configuration.

14. A method for non-invasive imaging of a sample containing at least one biological cell without labeling; the method comprising:

accommodating a sample within an environmental chamber;

receiving an illumination beam, generating a plurality of scanning illumination beams and directing each illumination beam at different angles towards the sample within the environmental chamber;

imaging said sample within said environmental chamber;

generating a plurality of three dimensional tomographic projections at various angles; and processing said images to create phase projections into a 3-D Fourier space and generating a three-dimensional refractive index distribution of said sample.

15. The method of claim 14, further comprising at least one of: (i) illuminating said sample at various angles at once or sequentially (ii) splitting the illumination beam into a plurality of spaced-apart beams to thereby separate complex wave fronts in the spatial frequency domain and projecting onto a camera a plurality of rotated holograms at once or (iii) simultaneously acquiring at once a plurality of off-axis interference patterns not overlapping in the spatial-frequency domain.

16. The method of claim 14, further comprising controlling fringe orientation of the off-axis interference patterns.

17. An environmental chamber for holding a sample to be rotated, the environmental chamber comprising:

a housing accommodating a sampling holder configured for holding said sample; said sampling holder having a non curved bottom surface defining an apex being formed by at least two inclined intersecting cross sections.

18. The environmental chamber of claim 17, further comprising an interferometric tomography module accommodated within said housing and being configured and operable for generating multiple interferometric projections of said sample at various angles, wherein said interferometric tomography module comprises an off-axis interferometer and a bright-field microscope.

19. The environmental chamber of claim 17, further comprising an illumination source generating an illumination beam towards said sample and a scanning rotating reflecting surface downstream to the illumination source; wherein said scanning rotating reflecting surface is configured for receiving the illumination beam from the illumination source and for sequentially directing the illumination beams at different angles towards the sample.

20. The environmental chamber of claim 19, wherein said illumination source and said scanning rotating reflecting surface are accommodated within said housing.

* * * * *